United States Patent Office 3,350,454
Patented Oct. 31, 1967

3,350,454
PROCESS OF PRODUCING AMINES
Herbert C. Brown, 1840 Garden St.,
West Lafayette, Ind. 47906
No Drawing. Filed Sept. 27, 1963, Ser. No. 312,014
12 Claims. (Cl. 260—583)

The present invention is concerned with a method of preparing organic amines and is particularly concerned with a method whereby an organoboron compound is converted into an amine.

Numerous methods have been employed for the production of primary, secondary and tertiary amines. One such well known prior art process involves reacting an alkylating agent such as an alkyl halide or dialkyl sulfate with an aqueous or alcoholic solution of ammonia. This alkylation of ammonia, theoretically, is the simplest method of preparing amines. However, there are very serious drawbacks to this process. It has been found that it is impossible to stop the alkylation reaction at a definite stage to produce either the primary, secondary and tertiary amines in predominance. This reaction rapidly goes to completion to form the undesirable quaternary ammonium products. The separation of the different reaction products of this process is extremely difficult.

Another method of preparation of amines is by the reaction of alcohols with zinc amine chloride. It has been found, however, that the yields obtained by this process are unusually small and the primary, secondary and tertiary amines are formed simultaneously in the reaction vessel, resulting in a mixture which is difficult to separate.

Accordingly, it is an object of this invention to provide a new and novel process for the production of amines. A particular object of this invention is to provide a process which produces the desired primary, secondary or tertiary amines while forming very little quaternary ammonium products. A specific object of this invention is to provide a process for reacting an organoboron compound with an amine to form a corresponding amine product. These and other objects will be evident from the following description of this invention.

The above and other objects are accomplished by the provision of a process for producing amines which comprises reacting an organoborane with an aminating agent selected from the group consisting of haloamines and hydroxyl amine sulfonic acid to produce the amine product.

A particular advantage of the process is that a rapid and efficient reaction between the organoboron compound and the amine is obtained. Another advantage of the process of this invention is that by varying the amine reactant one may obtain tailor-made hydrocarbon amine products. Hence, monohalo amines will produce primary amines, N-halo monoalkyl amines produce secondary amine products; while N-halo dialkyl amines produce tertiary amine products. Still another advantage to the process of this invention is that one may eliminate the unnecessary and tedious process of separating a mixture of primary, secondary and tertiary amines from quaternary ammonium compounds produced as a side reaction. Still a further advantage of the process of this invention is that the process can be controlled to prevent the production of quarternary ammonium compounds.

As indicated above, the present invention employs organoboron compound that has at least one carbon to boron bond and is exemplified by the formula

wherein R' is a hydrocarbyl group having from about one to about 40 carbon atoms and can be alkyl, cycloalkyl, aryl, alkaryl, alkenyl, cycloalkenyl or acetylenic, and X is hydrogen, oxygen, alkoxy or aryloxy, or a halide, and $n$ is an integer having a value of 1 to 3. X in the above formula should be esentially inert ligands. Typical examples of a boron reactant of this invention include dimethylethylborane, triethylborane, tri-n-propylborane, triisobutylborane, tri-n-octylborane, tri-n-cetylborane, diethylboron hydride, diethylboron chloride, diethylboron hydroxide, diethylboron ethoxide, diethylphenylborane, diphenylethylborane, diethylcyclohexylborane, ethyldivinylborane, tri(2-phenylethyl)borane, diethylcyclopentylborane, tri-exo-norbornylborane, tri-beta-pinyl borane, tri-B-phenylethylborane, tri - (alpha-methyl-beta-phenylethyl)borane, as well as the organoborane realized via the hydroboration of ethyl oleate, 10-undecenoic esters, 10-undecenol and 10-undecenoyl esters, cholesterol and related unsaturated steroids, and the like. It is to be understood that hydrocarbon groupings mentioned above can be further substituted with organic functional groups as long as these groups are essentially inert in the reaction. Included among these functional groups are halogens, alkoxy groups, keto groups, ester groups, carboalkoxy groups, sulfone groups, nitro groups, cyano groups, and the like. For ease of operation and because of greater availability, the trialkylboranes are preferred, especially those wherein the alkyl groups are hydrocarbon radicals having from 2 to 60 carbon atoms. It is particularly preferred, from a standpoint of availability, that the alkyl groups have from about 2 to about 40 carbon atoms.

As stated hereinabove the amine reactants employed in the process of this invention are the halo amines or hydroxylamine sulfonic acid. The halo amine which may be employed in the process may be exemplified by the formula

wherein R is a hydrocarbon group, X is a halide, and $n$ is an integer having a value of 0, 1 or 2. Typical examples of the halo amine reactants are:

monochloroamine,
monobromoamine,
monoiodoamine,
monofluoroamine,
N-chloromonomethylamine,
N-chloromonoethylamine,
N-chloromonobutylamine,
N-chloromonohexylamine,
N-chloromonodecylamine,
N-chloromonooctadecylamine,
N-chloromonodocosanylamine, N-bromomonopropylamine,
N-bromoisopropylamine,
N-bromomono-2-methylpentylamine,
N-bromomonododecylamine,
N-chloromethylethylamine,
N-chlorodiisopropylamine,
N-chlorodihexylamine,
N-bromododecylamine,
N-chloro-beta-phenylpropylamine.

The aminating agent may also be formed in situ in the reaction vessel. For example, sodium hypochlorite and ammonia form monochloramine in situ which in turn reacts with the organoborane to produce the desired amine product. Hence, other aminating agents may also be produced in situ by reacting any hydrocarbon amine having at least one nitrogen hydrogen bond with an alkali metal or alkaline earth metal hypohalite.

The amount of aminating agent required in the process of this invention may generally vary over a wide range. Generally the amount of aminating agent employed can vary from about 0.2 mole to about 6 moles of aminating agent per mole of organoborane. It is preferable, however, to employ approximately 1 mole of aminating agent for each equivalent of organoborane since higher yields of amine are obtained within this range at faster reaction rates.

In a preferred embodiment of this invention the process is conducted in the presence of a strong Lewis base. A strong Lewis base may be defined, for purposes of this invention, as any base having a pH greater than that of ammonia. Typical examples of the strong Lewis bases are the metal hydroxides such as the alkali metal, alkaline earth metal hydroxides, and quaternary ammonium hydroxides. These hydroxides include sodium hydroxide, lithium hydroxide, potassium hydroxide, rubidium hydroxide, cesium hydroxide, barium hydroxide, magnesium hydroxide, calcium hydroxide, strontium hydroxide, tetramethylammonium hydroxide, and the like.

These strong bases are usually added to the reaction mixture in the form of aqueous solutions. The amount of strong base employed will generally be an amount sufficient to make the pH of the system for alkaline or basic than ammonia. Hence the amount of base employed will depend on the volume of reactants and diluents. Generally, however, the amount of base employed will range from about 0.01 mole to about 2 moles of base per mole of organoborane reactant.

Although not necessary, it is preferable to conduct the process of this invention in an aqueous system. In many cases the process can be conducted in an aqueous system containing other diluents. For example, the organoborane can be produced by either a hydroboration or displacement reaction in the presence of a cyclic ether or polyglycol ether, and the reaction mass containing the organoborane can be directly reacted with the aminating agent in the aqueous system.

The time required for reacting the organoborane with the aminating agent generally varies over a wide range. Times ranging from about 1 minute to about 25 hours are generally sufficient for the reaction to go to completion. It is preferred, however, from the standpoint of economics, that the reaction time range from about 5 minutes to about 3 hours. It has been experienced that excellent yields are obtained within this general time range.

The temperature generally required for reacting the organoborane with the aminating agent will be at a temperature below the rapid decomposition temperature of the particular aminating agent employed. Generally, temperatures ranging from about $-10°$ C. up to about $100°$ C. are sufficient for the synthesis of the amines. It is preferred in the process of this invention that the temperature range be from about $0°$ C. up to about $80°$ C. since excellent results are obtained within this range.

A further embodiment of the present invention is the process of converting an olefinic material into an amine, which comprises the step of reacting an olefinic material with an alkali metal borohydride and strong acid in the presence of an ether to form an organoborane. The second step comprises reacting the organoborane with an aminating agent selected from the group consisting of haloamines and hydroxyl amine sulfonic acid.

Another embodiment of the present invention is the process of converting an olefinic material into an amine which comprises the steps of reacting an olefinic material with diborane in the presence of an ether to form an organoborane. The second step involves reacting the reaction mixture containing said organoborane product with an aminating agent selected from the group consisting of haloamines and hydroxylamine sulfonic acid at a temperature below the decomposition temperature of the aminating agent for a time sufficient to form the amine product.

Still a further embodiment of the present invention is the process of converting an olefinic material into an amine which comprises the steps of reacting an olefinic material with an organoborane at a temperature of at least $100°$ C. in the presence of an ether for a time sufficient for said olefinic material to displace the organo groups on said organoborane, thereby forming a new organoborane product. The new organoborane product is then reacted with an aminating agent selected from the group consisting of haloamines and hydroxyl amine sulfonic acid at a temperature below the decomposition temperature of the aminating agent for a time sufficient to form the organoamine product.

The latter three embodiments have many advantageous features. One advantage is that both processes provide a method for directly converting olefinic materials into the corresponding amines. A further advantage is that the processes do not require costly separation steps since the amination reaction can be conducted in the presence of the ethers and reaction products of the original hydroboration or displacement reactions with no adverse effect.

The many embodiments of this invention will be still better understood by the following examples in which all parts are by weight unless otherwise specified.

*Example I*

To a reaction vessel was added 50 ml. of tetrahydrofuran, 100 mmoles of 1-hexene and 33.3 mmoles of diborane in a tetrahydrofuran solution. The reaction mass was stirred and hydrogen was liberated. After stirring for one hour at $0°$ C., the unreacted hydride was decomposed by the addition of water. To the reaction vessel was added 25 ml. of 3 normal sodium hydroxide. The reaction vessel was maintained at $25°$ C. and 118 ml. of freshly prepared monochloroamine water solution containing 100 mmoles of chloroamine was added quickly to the reaction mixture with stirring, which was continued for a period of 30 minutes. The reaction mixture was then acidified with the addition of hydrochloric acid and stirred for a period of about 10 minutes. The liquid phases were separated and the aqueous solution was extracted three times by the addition of 15 mls. of ether, then saturated by the addition of sodium hydroxide. This saturated solution was extracted 7 times with 20-25 ml. portions of diethyl ether. The ether extract was then dried over sodium sulfate and subjected to vapor phase chromatography. The amine was isolated by removal of the ether. The product n-hexylamine was obtained in a 54 percent yield.

Similar excellent results are obtained when monobromoamine, monoiodoamine and hydroxylamine sulfonic acid are employed in place of the monochloroamine.

*Examples II–XIII*

The procedure of Example I was repeated in Examples II–XIII, using different organoboranes to obtain different hydrocarbonamine products. Chloramine was employed in all examples. The following table sets forth the data listing the reactants, conditions, products and percent yields.

TABLE I

| Example | Organoborane | Reaction Time, (min.) | Product | Percent Yield |
|---|---|---|---|---|
| II | Tri-2-hexylborane | 15 | 2-hexylamine | 26.6 |
| III | Tri-2-methyl-1-butylborane | 20 | 2-methyl-1-butylamine | 31.0 |
| IV | Tri-2-methyl-1-pentylborane | 30 | 2-methyl-1-pentylamine | 29.2 |
| V | Tri-2,4,4-trimethyl-1-pentylborane | 35 | 2,4,4-trimethyl-1-pentylamine | 27.8 |
| VI | Tri-4-methyl-1-pentylborane | 40 | 4-methyl-1-pentylamine | 57.0 |
| VII | Tri-4,4-dimethyl-1-pentylborane | 40 | 4,4-dimethyl-1-pentylamine | 55.0 |
| VIII | Tri-beta-phenyl-2-ethylborane | 30 | Phenyl-2-ethylamine | 58.4 |
| IX | Tri-2-phenylpropylborane | 30 | 2-phenylpropylamine | 57.6 |
| X | Tri-beta-pinylborane | 30 | Beta-pinylamine | 48.0 |
| XI | Tri-norbornylborane | 30 | Norbornylamine | 51.0 |
| XII | Tri-cyclohexylborane | 20 | Cyclohexylamine | 49.4 |
| XIII | Di-1-methylcyclohexylborane | 25 | 1-methylcyclohexylamine | 8.5 |

*Example XIV*

To a reactor equipped with internal agitation means, is added one mole of tri-n-propylborane and 3 parts of a dimethyl ether of diethylene glycol. The mixture is then heated to 140° C. and 3 moles of 1-dodecene is added to the reactor. At the end of several hours all of the propylene is evolved, resulting in the formation of the product tri-n-dodecylborane in the dimethyl ether of diethylene glycol. The temperature of the resulting reaction mixture is reduced to 25° C. and 3 moles of monomethyl monobromoamine in 10 parts of water is added quickly to the reaction mixture with stirring. The reaction mixture is then treated with 20 parts by volume of 3 normal sodium hydroxide and stirring is continued for 30 minutes. The reaction mixture is then acidified by the addition of hydrochloric acid and stirred for 10 minutes. The aqueous phase is extracted three times between the addition of ether and then saturated by the addition of sodium hydroxide. This saturated solution is then extracted again with diethyl ether. The ether solution is then dried over sodium sulfate. The product so produced is n-dodecylmethylamine in a good yield.

*Example XV*

In the reactor is placed 3 moles of alpha-methylstyrene and 0.75 mole of sodium borohydride and 1000 ml. of tetrahydrofuran. Hydroboration is accomplished by the additon of one mole of borontrifluoride, cooling the reactor so that the temperature does not rise above 350–40°. Water is added to the reactor and a solution of 3 moles of monochloramine in cold water is added to the reactor, followed by 6 moles of sodium hydroxide. After 3 hours at 0°, the solution is extracted several times with ether and a 60 percent yield of 2-phenyl-1-propylamine is isolated by distillation.

The following table represents the results obtained when the procedures as set forth above are repeated, using different organo boranes and aminating agents.

esters of alkenyl carboxylic acids in a liquid phase. The hydroboration reaction is conducted in the presence of a weak Lewis base catalyst at a temperature from about 0° C. to about 100° C. at about atmospheric pressure.

The term "olefinic" as used hereinabove is intended to refer to organic compounds which owe their unsaturation to the presence of one or more carbon to carbon double bonds. In the sense in which this term is used herein, aromatic rings, such as benzene and toluene, and alicyclic rings, such as cyclohexane, are not "unsaturated" and may be present in the olefinic compound as inert substituents.

The olefins include olefins such as: ethylene, propylene, cis- and trans-2-butene, 1-butene, 1-pentene, 2-pentene, 3-hexene, octenes, 1-diisobutylene, trimethylethylene, tetramethylethylene, decenes, 1-tetradecene, 1-octadecene; cyclic olefins such as, cyclopentene, cyclohexene, cycloheptene, pinene; substituted olefins such as: 1,1-diphenylethylene, p-nitrostyrene, p-carbethoxystyrene, styrene, 2-methylstyrene, methylmethacrylate, m-nitrostyrene, alpha-methylstyrene, beta-beta - diphenylethylene, nitroethylene, allylethylether, vinylbutyl ether, cholesterol, ethyl oleate, ethyl 10-undecenoate, etc.; dienes such as butadiene, cyclohexadiene, cyclooctadiene, limonene, etc. The olefinic organic compounds may bear certain functional groups which are not significantly reduced by diborane under the reaction conditions. Thus, the term "olefinic organic compound" also includes nitro olefins, halo olefins (e.g. allyl chloride), olefinic ethers such as the alkenyl alkyl ethers, olefinic acid chlorides, olefinic carboxylic esters (e.g. alkyl esters of alkenyl carboxylic acids such as ethyl oleate), olefinic borate esters, etc.

The Lewis bases in the hydroboration step in the process of this invention are specifically set forth in U.S. Patent 3,078,311 cited supra. Typical of these catalysts are ethers, organic esters, inorganic esters, sulfur derivatives, nitro derivatives, and the like. The products formed by this hydroboration technique include the diorganoborane and the triorganoborane products.

TABLE II

| Example | Organoborane | Aminating Agent | Product |
|---|---|---|---|
| XVI | Trihexacosylborane | Hydroxylamine sulfonic acid | N-hexacosylamine. |
| XVII | Tritetracontylborane | Monochloroamine | N-tetracontylamine. |
| XVIII | Trihexacontylborane | do | N-hexacontylamine. |
| XIX | Trioctadecylborane | Monobromoamine | N-octadecylamine. |
| XX | do | Monoiodoamine | Do. |
| XXI | do | N-chloromethylamine | |
| XXII | Tri-n-laurylborane | N-chlorodimethylamine | N-octadecylmethylamine. |
| XXIII | Diethyl boron hydroxide | Monochloroamine | Lauryldimethylamine. |
| XXIV | Organoborane from ethyl 10-undecenoate | do | Ethylamine. |
| XXV | Organoborane from ethyl oleate | do | 11-aminoundecanoic acid. |
| | | | 9- and 10-aminostearic acid. |

The hydroboration step of this invention can be completed in a number of ways. It is preferred, however, to employ hydroboration techniques set forth in my patent U.S. 3,078,311, which issued on Feb. 19, 1963. As noted in the examples above the hydroboration step involves reacting diborane with a co-reactive quantity of an unsaturated organic compound such as olefins, cyclic olefins, nitroolefins, halo olefins, alkenyl alkyl ethers and alkyl The step of converting olefin to an organoborane reactant involving the reaction of an olefinic material with an alkali metal borohydride is set forth in my U.S. Patent 2,925,437 issued on Feb. 16, 1960. This process comprises reacting an alkali metal borohydride such as sodium borohydride with hydrocarbons having an olefinic double bond in the presence of a strong Lewis acid such as aluminum chloride. The temperature at which the process is conducted ranges from about room temperature to about 100° C.

Solvents which may be employed in this process step include dioxane, tetrahydrofuran, diethyl ether, tetrahydropyran, the dimethyl ether of diethylene glycol, as well as of other glycols and of polyethylene glycols.

The strong acid catalyst employed in this step of the process may be further defined as a Friedel-Crafts catalyst. The catalysts include aluminum trichloride, gallium trichloride, titanium tetrachloride, aluminum bromide, borontrifluoride, borontrichloride, and the like.

The term "alkali metal borohydride" as used herein is intended to mean the simple alkali metal borohydrides, such as sodium borohydride, potassium borohydride and lithium borohydride.

The olefin referred to hereinabove is intended to refer to organic compounds which owe their unsaturation to the presence of an olefinic double bond or an acetylenic triple bond although such compounds may also contain an aromatic ring. More especially, these olefinic materials include 1-olefins, 2-olefins, cycloolefins and functionally substituted olefins. Typical examples of these olefin materials are ethylene, propylene, 1-butene, 2-butene, 1-pentene, 2-pentene, 1-hexene, 1-tetradecene, diisobutylene, cyclopentene, cyclohexene, styrene, and methyl styrene, p-nitro styrene and the like.

The displacement reaction step as set forth hereinabove is generally accomplished by the reaction of an organoboron compound having at least one carbon-to-boron bond and a straight chain hydrocarbon grouping of at least 2 carbon atoms with an unsaturated compound in the presence of a polyether or cyclic ether at a temperature of at least about 100° C., to produce a new organoboron compound. This procedure is set forth in my U.S. Patent 3,078,308, which issued Feb. 19, 1963.

The organoboron reactant employed is generally one that has at least one carbon-to-boron bonding with the organo radical having at least two carbon atoms so that when the displacement by the unsaturated reactant occurs, an olefinic material is liberated. Thus, the organic portion must have an alkyl configuration of at least two carbon atoms in length but it is to be understood that the alkyl group can have further substituents on the second or other carbon atoms including radicals, such as alkenyl, cycloalkyl, cycloalkenyl, aryl, alkaryl, and acetylenic. The remaining valences of the boron atom are satisfied by similar or other organic radicals or by essentially inert ligands, such as the halogens, alcohol residues, and the like. Typical examples of the boron reactant include dimethylethylborane, triethylborane, tripropylborane, triisobutylborane, trioctylborane, diethylboron hydride, diethylboron chloride, diethylboron ethoxide, diethylphenylborane, diphenylethylborane, diethylcyclohexylborane, ethyldivinylborane, tri-(2-phenylethyl)borane, diethylcyclopentylborane, and the like. It is to be understood that the hydrocarbon groupings mentioned above can be further substituted with organic functional groups provided such are essentially inert in the reaction. Included among such functional groups are, for example, the halogens, keto groups, ester groups, and the like.

The unsaturated compound which is employed in the displacement reaction is intended to mean a compound which has one or more carbon-to-carbon double bonds or carbon-to-carbon triple bonds. This would, of course, not include aromatic materials since such are not ordinarily considered as unsaturated compounds. Typical examples of such unsaturated compounds are ethylene, propylene, cis- and trans-2-butene, 1-butene, 1-pentene, 2-pentene, 3-hexene, the octenes, 1-diisobutylene, trimethylethylene, tetramethylethylene, the decenes, 1-tetradecene, 1-octadecene; cyclic olefins such as: cyclopentene, cyclohexene, cycloheptene, pinene; substituted olefins such as: 1,1-diphenylethylene, p-nitrostyrene, p-carbethoxystyrene, styrene, 2-methylstyrene, methylmethacrylate, m-nitrostyrene, alpha-methylstyrene, beta-beta-diphenylethylene, nitroethylene, allylethylether, vinylbutyl ether; dienes such as butadiene and cyclohexadiene, and acetylenes such as 1-hexyne and 2-hexyne, acetylene and methyl acetylene; nitro olefins, halo olefins (e.g. allyl chloride), unsaturated ethers, unsaturated acid chlorides, unsaturated carboxylic esters and salts (e.g. ethyl oleate and sodium oleate), unsaturated borate esters, and the like. While it is evident from the above that, in general, any olefins or acetylenic materials are applicable in the process, it is preferable to employ the alpha-olefins, especially those having between about 2 to 30 carbon atoms inclusive. The alpha-olefinic materials, particularly hydrocarbon alpha-olefins, are more effective in the displacement reaction and are more economical and readily available.

Having thus described the embodiments of this invention, it is not desired to be bound except as set forth in the following claims.

I claim:

1. A process for producing amines which process comprises reacting (I) an organoborane having an organo group directly linked to boron by a carbon-to-boron bond, (II) with hydroxylamine monosulfonic acid or with a haloamine having the formula $R_nNH_{2-n}X$ where R is a hydrocarbyl group, X is a halogen, and $n$ is 0, 1 or 2, to remove said organo group from the boron and aminate the organo group to form the corresponding amine.

2. The process of claim 1 in which the organo group is a hydrocarbyl group having from about 2 to about 40 carbon atoms.

3. The process of claim 1 in which the II reactant is the haloamine, and $n$ is zero.

4. The process of claim 1 in which the II reactant is the haloamine and X is chlorine.

5. The process of claim 1 in which the II reactant is monochloramine.

6. The process of claim 1 further characterized in that the reaction is conducted in an aqueous system.

7. The process of claim 1 further characterized in that the process is conducted in the presence of a strong Lewis base.

8. The process of producing a primary amine which comprises reacting a trialkyl borane with monochloramine at a temperature of from about −10° C. up to about 100° C. for a time sufficient to form the primary amine product.

9. The process of converting an olefinic compound into an amine which comprises the steps of reacting the olefinic compound with diborane in the presence of an ether to form an organoborane and thereafter contacting the reaction mixture containing said organoborane with an aminating agent selected from the group consisting of hydroxylamine monosulfonic acid and a haloamine having the formula $R_nNH_{2-n}X$ where R is a hydrocarbyl group, X is a halogen, and $n$ is 0, 1 or 2, the contacting being effected at a temperature and for a time sufficient to cause the organoborane and the aminating agent to react to form amine.

10. The process of claim 9 in which the diborane used is formed in situ by reacting an alkali metal borohydride with a strong Lewis acid.

11. The process of claim 10 in which the strong Lewis acid is $BF_3$.

12. The process of converting an olefinic compound into an amine which comprises the steps of reacting the olefinic compound with an organoborane at a temperature of at least 100° C. in the presence of an ether for a time sufficient for said olefinic compound to displace an organo group from said organoborane thereby forming a new organoborane product and then reacting said product with an aminating agent selected from the group consisting of hydroxyl-amine monosulfonic acid and a haloamine having the formula $R_nNH_{2-n}X$ where R is a hydrocarbyl group, X is a halogen, and $n$ is 0, 1 or 2, the contacting being effected at a temperature and for a time sufficient to cause the organoborane and the aminating agent to react to form the amine.

References Cited

Spialter et al.: The Acylic Aliphatic Tertiary Amines, The MacMillan Company, New York, 1965, pages 83 and 84.

CHARLES B. PARKER, *Primary Examiner.*

R. L. RAYMOND, *Assistant Examiner.*